United States Patent
Moreno et al.

(10) Patent No.: US 11,632,313 B2
(45) Date of Patent: *Apr. 18, 2023

(54) SYSTEMS AND METHODS FOR SIDE-CHANNEL MONITORING OF A LOCAL NETWORK

(71) Applicants: Carlos Moreno, Waterloo (CA); Sebastian Fischmeister, Waterloo (CA)

(72) Inventors: Carlos Moreno, Waterloo (CA); Sebastian Fischmeister, Waterloo (CA)

(73) Assignee: Palitronica Inc., Kitchener (CA)

( * ) Notice: Subject to any disclaimer, the term of this patent is extended or adjusted under 35 U.S.C. 154(b) by 175 days.

This patent is subject to a terminal disclaimer.

(21) Appl. No.: 16/874,507

(22) Filed: May 14, 2020

(65) Prior Publication Data

US 2020/0366579 A1 Nov. 19, 2020

Related U.S. Application Data

(60) Provisional application No. 62/847,441, filed on May 14, 2019.

(51) Int. Cl.
*H04L 12/26* (2006.01)
*H04L 43/04* (2022.01)
(Continued)

(52) U.S. Cl.
CPC .............. *H04L 43/04* (2013.01); *H04L 12/40* (2013.01); *H04L 41/0631* (2013.01);
(Continued)

(58) Field of Classification Search
CPC ... H04L 12/40; H04L 41/0631; H04L 63/126; H04L 63/1408; H04L 63/1425; H04L 63/1466; H04L 2012/40215
See application file for complete search history.

(56) References Cited

U.S. PATENT DOCUMENTS 9,268,938 B1 * 2/2016 Aguayo Gonzalez ...................... G01R 31/2893
2010/0100964 A1 * 4/2010 Mahaffey .............. G06F 21/577 726/25

(Continued)

OTHER PUBLICATIONS

Soil, Korak, et al., EM-Based Detection of Hardware Trojans of FPGAs, IEEE 2014 (Year: 2014).*

(Continued)

*Primary Examiner* — Vance M Little
(74) *Attorney, Agent, or Firm* — Bereskin & Parr LLP/S.E.N.C.R.L., s.r.l.

(57) ABSTRACT

Systems and methods for side-channel monitoring a local network are disclosed. The methods involve generating a program trace signal from at least one of power consumption, electromagnetic emission, or acoustic emanation of a control processor connected to the local network and operating a monitoring processor to detect a communication of a message on the local network; identify at least one purported control processor related to the communication; analyze the program trace signal of the at least one purported control processor relative to the communication; and at least one of an authenticate or verify one or more purported control processors of the at least one purported control processor based on the program trace signal of the at least one purported control processor.

20 Claims, 3 Drawing Sheets

(51) Int. Cl.
H04L 43/065 (2022.01)
H04L 41/0631 (2022.01)
H04L 43/062 (2022.01)
H04L 12/40 (2006.01)
H04L 43/0817 (2022.01)
H04L 9/40 (2022.01)

(52) U.S. Cl.
CPC .......... H04L 43/062 (2013.01); H04L 43/065 (2013.01); H04L 43/0817 (2013.01); H04L 63/126 (2013.01); H04L 63/14 (2013.01); H04L 63/1408 (2013.01); H04L 63/1425 (2013.01); H04L 63/1441 (2013.01); H04L 63/1466 (2013.01); H04L 2012/40215 (2013.01)

(56) References Cited

U.S. PATENT DOCUMENTS

2016/0327596 A1* 11/2016 Salajegheh .......... G01R 31/002
2019/0253439 A1* 8/2019 Payton ................... H04L 12/40

OTHER PUBLICATIONS

Boggs, Chau and Cui, Utilizing Electromagnetic Emanations for Out-of-Band Detection of Unknown Attack Code in a Programmable Logic Controller, Proceedings of SPIE Defense + Security 2018, Orlando Florida, US. (Year: 2018).*
Liu, et al., On Code Execution Tracking via Power Side-Channel, ACM 2016 (Year: 2016).*
Checkoway, S., McCoy, D., Kantor, B., Anderson, D., Shacham, H., Savage, S., Koscher, K., Czeskis, A., Roesner, F. and Kohno, T., Aug. 2011. Comprehensive experimental analyses of automotive attack surfaces. In USENIX Security Symposium (vol. 4, pp. 447-462).
Cho, K.T. and Shin, K.G., 2016. Fingerprinting electronic control units for vehicle intrusion detection. In 25th {USENIX} Security Symposium ({USENIX} Security 16) (pp. 911-927).
Cho, K.T. and Shin, K.G., Oct. 2017. Viden: Attacker identification on in-vehicle networks. In Proceedings of the 2017 ACM SIGSAC Conference on Computer and Communications Security (pp. 1109-1123).
Groza, B., Murvay, S., Herrewege, A.V. and Verbauwhede, L, 2017. Libra-can: Lightweight broadcast authentication for controller area networks ACM Transactions on Embedded Computing Systems (TECS), 16(3) (pp. 1-28).

Kneib, M. and Huth, C., Jan. 2018. Scission: Signal characteristic-based sender identification and intrusion detection in automotive networks. In Proceedings of the 2018 ACM SIGSAC Conference on Computerand Communications Security (pp. 787-800).
Koscher, K., Czeskis, A., Roesner, F., Patel, S., Kohno, T., Checkoway, S., McCoy, D., Kantor, B., Anderson, D., Shacham, H. and Savage, S., May 2010. Experimental security analysis of a modem automobile. In 2010 IEEE Symposium on Security and Privacy (16 pages).
Brown, D.A., Cooper, G., Gilvarry, L, Grawrock, D., Rajan, A., Tatourian, A., Venugopalan, R., Vishik, C., Wheeler, D., Zhao, M. and Clare, D., 2015. Automotive security best practices: recommendations for security and privacy in the era of the next-generation car. White Paper, McAfee Inc, 62 (23 pages).
Miller, C. and Valasek, C., 2015. Remote exploitation of an unaltered passenger vehicle. Black Hat USA, 2015 (pp. 1, 5-6, 87-88).
Miller, C. and Valasek, C., 2016. Advanced CAN injection techniques for vehicle networks. YouTube [online] [video]. Presentation at BlackHat USA. [retrieved on May 21, 2020]. Retrieved from </https://www.youtube.com/watch?v=4wgEmNlu20c> (33 pages).
Mukherjee, S., Shirazi, H., Ray, L, Daily, J. and Gamble, R., Dec. 2016. Practical DoS attacks on embedded networks in commercial vehicles. In International Conference on Information Systems Security (pp. 23-42), Springer, Cham.
Murvay, P.S. and Groza, B., 2014. Source identification using signal characteristics in controller area networks. IEEE Signal Processing Letters, 21(4) (4 pages).
Petit, J. and Shladover, S.E., 2014. Potential cyberattacks on automated vehicles. IEEE Transactions on Intelligent transportation systems, 16(2) (10 pages).
Pike, L., Sharp, J., Tullsen, M., Hickey, P.O. and Bielman, J., May 2015. Securing the automobile: A comprehensive approach. In Embedded Security in Cars (ESCAR) Conference (10 pages).
CAN Specification, Version 2.0, Sep. 1991, Robert Bosch GmbH, Stuttgart, Germany (72 pages).
Surface Vehicle Recommeded Practice - Cybersecurity Guidebook for Cyber-Physical Vehicle Systems, J3061, Jan. 2016 (pp. 1-6), SAE International.
Sagong, S.U., Ying, X., Clark, A., Bushnell, L. and Poovendran, R., Apr. 2018. Cloaking the clock: emulating clock skew in controller area networks. In 2018 ACM/IEEE 9th International Conference on Cyber-Physical Systems (ICCPS) (pp. 32-42), IEEE.
Van Herrewege, A., Singelee, D. and Verbauwhede, I., Nov. 2011. CANAuth-a simple, backward compatible broadcast authentication protocol for CAN bus. In ECRYPT Workshop on Lightweight Cryptography (vol. 2011) (7 pages).

* cited by examiner

SYSTEMS AND METHODS FOR SIDE-CHANNEL MONITORING OF A LOCAL NETWORK

CROSS-REFERENCE TO RELATED APPLICATION

This application claims the benefit of U.S. Provisional Patent Application No. 62/847,441, filed on May 14, 2019. The entire contents of U.S. Provisional Patent Application No. 62/847,441 is hereby incorporated by reference

FIELD

The embodiments described herein relate to the field of embedded computing systems, and in particular, side-channel analysis of embedded computing systems for security, safety, and development.

BACKGROUND

Security and safety can be essential aspects of embedded computing systems, especially safety-critical systems, and in view of the ever-increasing connectivity of such systems. Traditionally, safety-critical systems have used runtime monitoring techniques to enforce security and safety properties during operation. However, monitoring security and safety properties poses unique challenges. The functionality of safety-critical systems should not be disrupted by such monitoring. In addition, firmware reprogramming can bypass a monitoring tool if it runs alongside the monitored and vulnerable system. Furthermore, if malware runs on the same processor as the monitoring tool, then malware can "fake" behaviors that the monitoring tool will consider acceptable.

An example of a safety-critical embedded computing system can be found in the automotive space. The typical local communication network in an automotive vehicle is a CAN bus, to which a plurality of electronic control units (ECUs) connected. CAN buses are a fundamentally insecure communication network. However, cybersecurity has not historically been a critical aspect of automotive vehicles nor as widespread in automotive vehicles as it is with other technologies such as electronic devices. This is due to automotive vehicles having had little or no connectivity to the outside world. However, automotive vehicles now include a high level of connectivity. Furthermore, with the prospect of autonomous vehicles, cybersecurity is a critical aspect in modern automotive vehicles.

Existing methods of addressing cybersecurity in automotive vehicles include the use of cryptography to authenticate a sender. However, such methods can have limited applicability due to the broadcast nature and relatively low bandwidth of CAN buses. Furthermore, automotive vehicles often include commercial off-the-shelf (COTS) devices because they are readily available. However, COTS devices are generally heterogeneous. As such, it can be difficult to set up and share common secrets between devices on the CAN bus for symmetric-key cryptographic primitives.

Some other methods to address cybersecurity in automotive vehicles involve fingerprinting some physical characteristic(s) of the transmitting device. For example, timing-based detection of impersonating devices have been proposed. However, such methods can be vulnerable to profile-and-mimic attacks in which timing characteristics are fingerprinted and emulated by an attacker. Some other proposed methods involve voltage-based sender identification techniques. However, such methods can also be vulnerable to profile-and-mimic attacks because an attacker with temporary physical access to the CAN bus could place a transmitter having a custom-made analog CAN driver on the CAN bus to inject an arbitrary waveform on the CAN bus. This is particularly plausible since the proposed voltage-based sender identification techniques do not use the complete analog waveform of transmissions, but instead they extract some statistical characteristics of the voltage, making it easier to emulate by an attacker.

SUMMARY

The various embodiments described herein generally relate to side-channel monitoring systems and methods of operating thereof. The disclosed methods and systems can relate to authenticating and verifying embedded computing systems.

In accordance with an example embodiment, there is provided a system for side-channel monitoring of a local network. The system includes a plurality of control processors connected to the local network; a detector for each control processor; and a monitoring processor. The detectors are operable to generate a program trace signal from at least one of power consumption, electromagnetic emission, or acoustic emanation of the respective control processor. The monitoring processor is operable to detect a communication of a message on the local network; identify at least one purported control processor related to the communication; analyze the program trace signal of the at least one purported control processor relative to the communication; and at least one of authenticate or verify the one or more purported control processors of the at least one purported control processor based on the program trace signal of the at least one purported control processor.

In some embodiments, the at least one purported control processor can include a purported transmitter of the message; and the monitoring processor can be operable to authenticate the purported transmitter of the message.

In some embodiments, the monitoring processor being operable to analyze the program trace signal of the at least one purported control processor relative to the communication can include the monitoring processor being operable to analyze the program trace signal of the purported transmitted of the message during the communication.

In some embodiments, the monitoring processor can be operable to analyze the program trace signal of each control processor of the plurality of control processors; and classify each control processor as being one of transmitting the message or not transmitting the message based on the program trace signal.

In some embodiments, the monitoring processor can be operable to generate an anomaly notification in response to having classified each control processor of the plurality of control processors as not transmitting the message.

In some embodiments, the at least one purported control processor can include an intended recipient of the message; and the monitoring processor can be operable to verify the intended recipient of the message.

In some embodiments, the monitoring processor being operable to analyze the program trace signal of the at least one purported control processor relative to the communication can include the monitoring processor being operable to analyze the program trace signal of the intended recipient of the message following the communication.

In some embodiments, the monitoring processor can be operable to analyze the program trace signal of each control processor of the plurality of control processors; and classify each control processor as being one of processing the message or not processing the message based on the program trace signal.

In some embodiments, the monitoring processor can be operable to generate an anomaly notification in response to having classified a control processor of the plurality of control processors as processing the message and not identified as the intended recipient of the message.

In some embodiments, the system can further include a computer memory for storing a plurality of expected program trace samples; and the monitoring processor can be operable to compare the program trace signal of the at least one purported control processor to an expected program trace signal.

In some embodiments, the monitoring processor being operable to analyze the program trace signal of the at least one purported control processor can include the monitoring processor being operable to analyze contiguous or overlapping segments of the program trace signal of the at least one purported control processor.

In some embodiments, lengths of the segments of the program trace signal of the at least one purported control processor can be variable.

In some embodiments, the lengths of the segments of the program trace signal of the at least one purported control processor can be based on at least one of a content of the message, a configuration of the monitoring processor, a minimum time for non-empty messages, or a maximum time for messages.

In some embodiments, the local network can include a controller area network.

In some embodiments, the message can include a command for the at least one purported control processor.

In accordance with an embodiment, there is provided a method for monitoring a local network. The method includes generating a program trace signal from at least one of power consumption, electromagnetic emission, or acoustic emanation of a control processor connected to the local network; and operating a monitoring processor to detect a communication of a message on the local network; identify at least one purported control processor related to the communication; analyze the program trace signal of the at least one purported control processor relative to the communication; and at least one of an authenticate or verify one or more purported control processors of the at least one purported control processor based on the program trace signal of the at least one purported control processor.

In some embodiments, the at least one purported control processor can include a purported transmitter of the message; and the method can involve operating the monitoring processor to authenticate the purported transmitter of the message.

In some embodiments, operating the monitoring processor to analyze the program trace signal of the at least one purported control processor relative to the communication can involve operating the monitoring processor to analyze the program trace signal of the purported transmitter of the message during the communication.

In some embodiments, the method can involve operating the monitoring processor to analyze the program trace signal of each control processor of a plurality of control processors on the local network; and classify each control processor as being one of transmitting the message or not transmitting the message based on the program trace signal.

In some embodiments, the method can involve operating the monitoring processor to generate an anomaly notification in response to having classified each control processor of the plurality of control processors as not transmitting the message.

In some embodiments, the at least one purported control processor can include an intended recipient of the message; and the method can involve operating the monitoring processor to verify the intended recipient of the message.

In some embodiments, operating the monitoring processor to analyze the program trace signal of the at least one purported control processor relative to the communication can involve operating the monitoring processor to analyze the program trace signal of the intended recipient of the message following the communication.

In some embodiments, the method can involve operating the monitoring processor to analyze the program trace signal of each control processor of the plurality of control processors; and classify each control processor as being one of processing the message or not processing the message based on the program trace signal.

In some embodiments, the method can involve operating the monitoring processor to generate an anomaly notification in response to having classified a control processor of the plurality of control processors as processing the message and not identified as the intended recipient of the message.

In some embodiments, the method can involve storing a plurality of expected program trace samples; and operating the monitoring processor to compare the program trace signal of the at least one purported control processor to an expected program trace signal.

In some embodiments, operating the monitoring processor to analyze the program trace signal of the at least one purported control processor can involve operating the monitoring processor to analyze contiguous or overlapping segments of the program trace signal of the at least one purported control processor.

In some embodiments, lengths of the segments of the program trace signal of the at least one purported control processor can be variable.

In some embodiments, the lengths of the segments of the program trace signal of the at least one purported control processor can be based on at least one of a content of the message, a configuration of the monitoring processor, a minimum time for non-empty messages, or a maximum time for messages.

In some embodiments, the local network can include a controller area network.

In some embodiments, the message can include a command for the at least one purported control processor.

BRIEF DESCRIPTIONS OF THE DRAWINGS

For a better understanding of the embodiments described herein and to show more clearly how they may be carried into effect, reference will now be made, by way of example only, to the accompanying drawings which show at least one exemplary embodiment, and in which.

The skilled person in the art will understand that the drawings, described below, are for illustration purposes only. The drawings are not intended to limit the scope of the applicants' teachings in anyway. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

The various embodiments described herein generally relate to methods (and associated systems configured to implement the methods) for side-channel monitoring of processing units connected to a local network.

In the automotive field, processing units such as electronic control units (ECUs) are connected to a local network such as a CAN bus. Each ECU typically controls one or more electrical systems in the vehicle, such as but not limited to the engine, power train, transmission, brakes, and suspension.

The local network can be monitored in order to authenticate processing units that send (i.e., transmit) or receive messages on the local network. More specifically, given an ongoing or past transmission, the local network can be monitored in order to determine as early as possible whether the transmission is actually sent by the purported sender (i.e., by the sender identified in the transmitted data), and/or determine whether the intended recipient of the message correctly processed the message (i.e., whether the intended recipient reacted to the transmitted message in the usual/normal way).

Side-channel monitoring involves capturing involuntary emissions (i.e., side-channels) of the processing units connected to the local network, such as power consumption, electromagnetic (EM) emissions, and acoustic emanations. Power consumption, EM emission measurements, and acoustic emanation measurements as a function of time can be referred to as power traces, EM emissions traces, or acoustic traces.

Monitoring side-channels of an embedded computing system as it executes a program allows for non-intrusive program tracing, or more generally, program traces. The program traces can be correlated to program code executed by the embedded computing system or observed behavior of the embedded computing system during the program trace, in order to determine the sequence of executed instructions that the embedded computing system executed.

In at least one embodiment, a plurality of embedded computing systems can be connected to a local network to communicate with one another via the local network. A first embedded computing system connected to the local network can transmit a message over the local network. A second embedded computing system connected to the local network can receive the message from the local network. Program traces captured from the first and second embedded computing systems during the time of the communication can indicate that the first embedded computing system transmitted the message and the second embedded computing system did not transmit the message, respectively. Likewise, program traces captured from the first and second embedded computing systems in the time following the communication can indicate that the first embedded computing system did not process the message and the second embedded computing system processed the message, respectively.

For example, in the automotive field, a plurality of ECUs are connected to a CAN bus. Program traces can be obtained from each of the ECUs connected to the CAN bus to determine whether a particular ECU sent a message, thus authenticating the sender of the message. Similarly, the program traces can be used to determine whether a particular ECU processed the message, thus authenticating the receiver of the message. The program trace of the receiver can also be used to verify the execution of instructions of the message.

Figure 1:
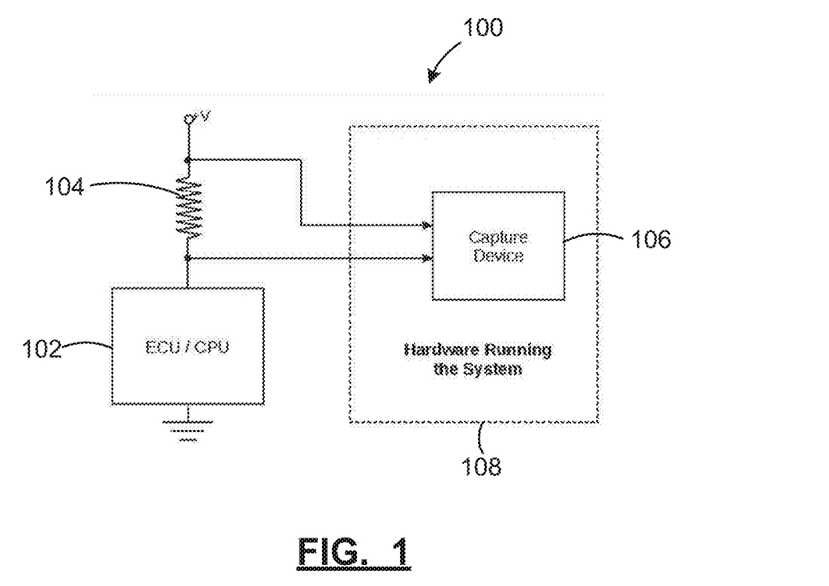
FIG. 1 depicts a power-tracing detector for an embedded computing system, in accordance with at least one embodiment.

Referring to FIG. 1, shown therein is a diagram of a detector 100 for obtaining a power consumption program trace of an embedded computing system, that is, a control processor 102, in accordance with at least one embodiment. Although the control processor 102 is shown as being an ECU/CPU, any embedded computing system can be monitored by the detector 100. In at least one embodiment, the embedded computing system can be a microprocessor, memory chips, or interface circuits.

As shown in FIG. 1, the detector includes a resistor 104 and a capture device 106. The resistor 104 can be placed in series with the power input line of the control processor 102. An analog signal indicative of the power consumption of the control processor 102, or the program trace, can be obtained by measuring current or voltage across the resistor 104.

The capture device 106 can measure current across the resistor 104 in order to obtain the program trace. In addition, the capture device 106 can digitize the program trace. In at least one embodiment, the capture device 106 can be a contactless current sensor. In at least one embodiment, the capture device 106 can include an analog-to-digital converter. In at least one embodiment, the capture device 106 can be a sound card, oscilloscope, or a digital oscilloscope. The program trace obtained by capture device 106 can be used by the monitoring system 108 for authenticating or verifying the control processor 102.

Figure 2:
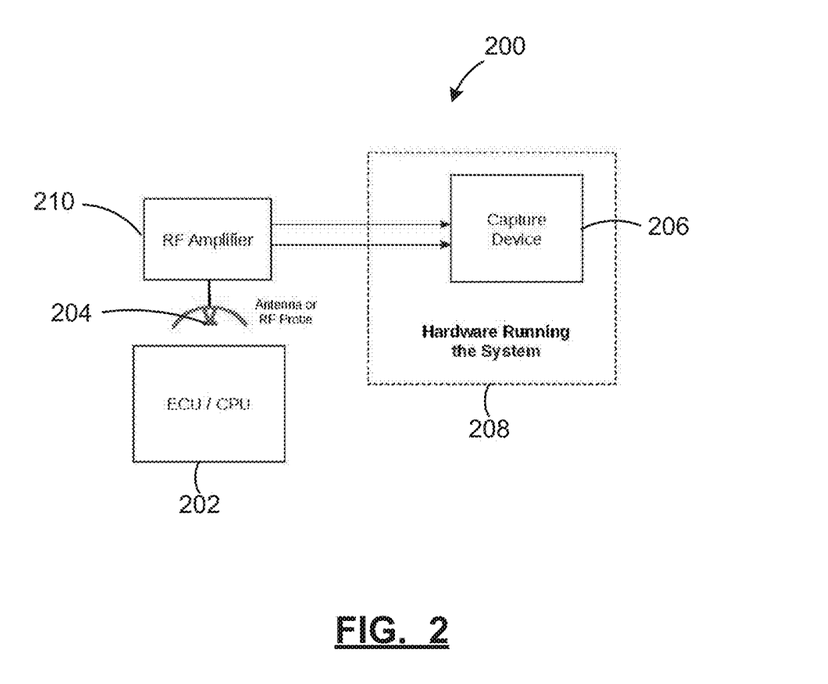
FIG. 2 depicts an electromagnetic emissions tracing detector for an embedded computing system, in accordance with at least one embodiment.

Referring to FIG. 2, shown therein is a diagram of a detector 200 for obtaining an electromagnetic emissions program trace of an embedded computing system, that is, a control processor 202, in accordance with at least one embodiment. Although the control processor 202 is shown as being an ECU/CPU, any embedded computing system can be monitored by the detector 200. In at least one embodiment, the embedded computing system can be a microprocessor, memory chips, or interface circuits.

As shown in FIG. 2, the detector includes a radiofrequency (RF) probe, or antenna 204, an RF amplifier 210, and a capture device 206. The antenna 204 can be placed in the vicinity of the control processor 202 to detect electromagnetic emissions of the control processor 202. In some embodiments, additional signal conditioning is required in order to provide a signal within the operating range of the capture device 206. In some embodiments, the antenna 204 can be cascaded with an RF amplifier 210 to increase the strength of the signal from the antenna 204.

The capture device 206 can measure current across the antenna 204 in order to obtain the program trace. In addition, the capture device 206 can digitize the program trace. In at least one embodiment, the capture device 206 can be a contactless current sensor. In at least one embodiment, the capture device 206 can include an analog-to-digital converter. In at least one embodiment, the capture device 206 can be a sound card, oscilloscope, or a digital oscilloscope.

The program trace obtained by capture device 206 is used by the monitoring system 208 for authenticating or verifying the control processor 202.

Figure 3:
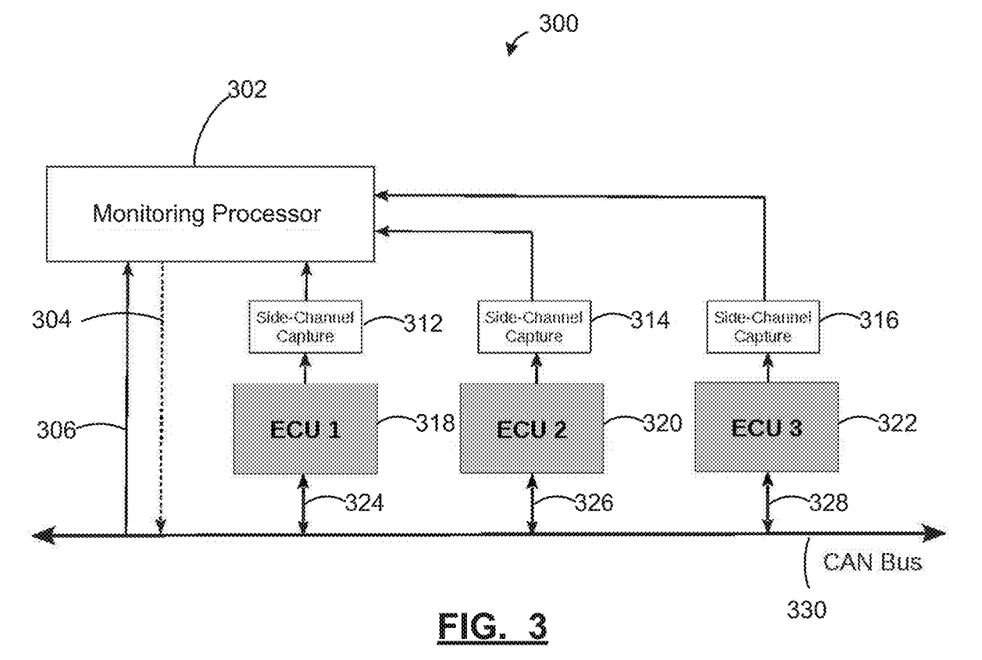
FIG. 3 depicts a system for side-channel monitoring of a local network, in accordance with at least one embodiment.

Referring to FIG. 3, shown therein is a diagram of a system 300 for side-channel monitoring of a local network, in accordance with at least one embodiment. The system 300 includes a monitoring processor 302 connected 304, 306 to a local network 330 and detectors 312, 314, 316. The detectors 312, 314, 316 obtain program traces of the control processors 318, 320, and 322 connected to the local network 330.

In this example, three control processors 318, 320, and 322 are connected 324, 326, and 328 to a local network 330. Although the control processors 318, 320, and 322 as shown as being ECUs, any embedded computing system can be monitored by the monitoring system 300. In at least one embodiment, the control processors 18, 320, and 322 can be a microprocessor, memory chips, or interface circuits. Furthermore, only three control processors 318, 320, and 322 are shown in FIG. 3, however the system can monitor any number of control processors. In addition, although a CAN bus is shown as being the local network 330, other local networks are possible.

The system 300 includes detectors 312, 314, 316 for each of the control processors 318, 320, and 322. That is, each detector 312, 314, 316 includes a single probe to capture a single program trace, similar to detectors 100 and 200. However, in some embodiments, a detector can include multiple probes to capture multiple program traces from multiple control processors.

Furthermore, any combination of types of detectors 312, 314, 316 can be used in a system to capture multiple program traces. For example, detector 312 can capture a power program trace, while detector 314 can capture an EM program trace, while detector 316 can capture an acoustic program trace.

The detectors 100, 200, and 300 can include additional processing such as, but not limited to digital signal processing, statistical signal processing, statistical pattern recognition, correlation analysis, mutual information analysis, system identification, etc.

The monitoring processor 302 may be any suitable processors, controllers, digital signal processors, graphics processing units, application specific integrated circuits (ASICs), and/or field programmable gate arrays (FPGAs) that can provide sufficient processing power depending on the configuration, purposes and requirements of the monitoring system 302. In some embodiments, the monitoring processor 302 can include more than one processor with each processor being configured to perform different dedicated tasks.

The monitoring processor 302 may be configured to control the operation of the monitoring system 300. The monitoring processor 302 can include modules that initiate and manage the operations of the monitoring system 300. The monitoring processor 302 may also determine, based on received data, stored data and/or user preferences, how the monitoring system 300 may generally operate.

When transmitting a message, the input and output activity in the processing unit will cause a distinct pattern in the power consumption and other side-channels such as electromagnetic emissions. By looking at the identification data of the message, it can be determined which is the purported transmitting processing unit; looking at the power consumption (or other side-channels) pattern for the purported transmitting processing unit, it can be determined whether the sender is authentic (i.e., whether the purported transmitter is indeed the actual ECE that is transmitting). Similarly for the receiving processing unit, in the period of time immediately following the transmission of the message, the legitimate recipient should exhibit a pattern in power consumption or other side-channels consistent with the normal reaction (execution) to the received command data of the message.

Side-channel monitoring is generally not vulnerable to profile-and-mimic attacks because it is based on physical characteristics correlated to the processing unit's activity, which is independent and physically inaccessible to attackers. The actual power consumption that results from transmitting a message can generally only occur when transmitting a message. A different processing unit transmitting a message cannot readily change this. Thus, a remote attacker without physical access to the local network that compromises a processing unit on the local network cannot generally achieve a profile-and-mimic attack. For an attacker with physical access to the local network (i.e., a processing unit on the local network), side-channel monitoring may still detect the attack.

Side-channel monitoring may also be used to mitigate spoofing attacks. An example of a spoofing attack is a device on the local network that is compromised. Another example of a spoofing attach is an "alien" device on the local network transmitting messages with identification data corresponding to a different device that the "alien" device is impersonating. Side-channel monitoring may also be used to identify hidden functionality in other devices. If an device other than the intended recipient exhibits a highly unusual pattern in reaction to the received command, it may be an indication that that device has been compromised and has some hidden/unintended functionality. For example, the compromised device could be analyzing traffic on the local network and collecting data in preparation to execute a future attack.

Side-channel monitoring may also be used to identify active attacks that are disrupting a device's ability to transmit, or generally disrupting communications on the local network. For example, side-channel monitoring can identify an anomalous condition in which the local network shows now transmissions but the power consumption pattern corresponding to a transmitting device is observed. When an anomalous condition is detected, the system can issue a notification on the local network for other devices.

Figure 4:
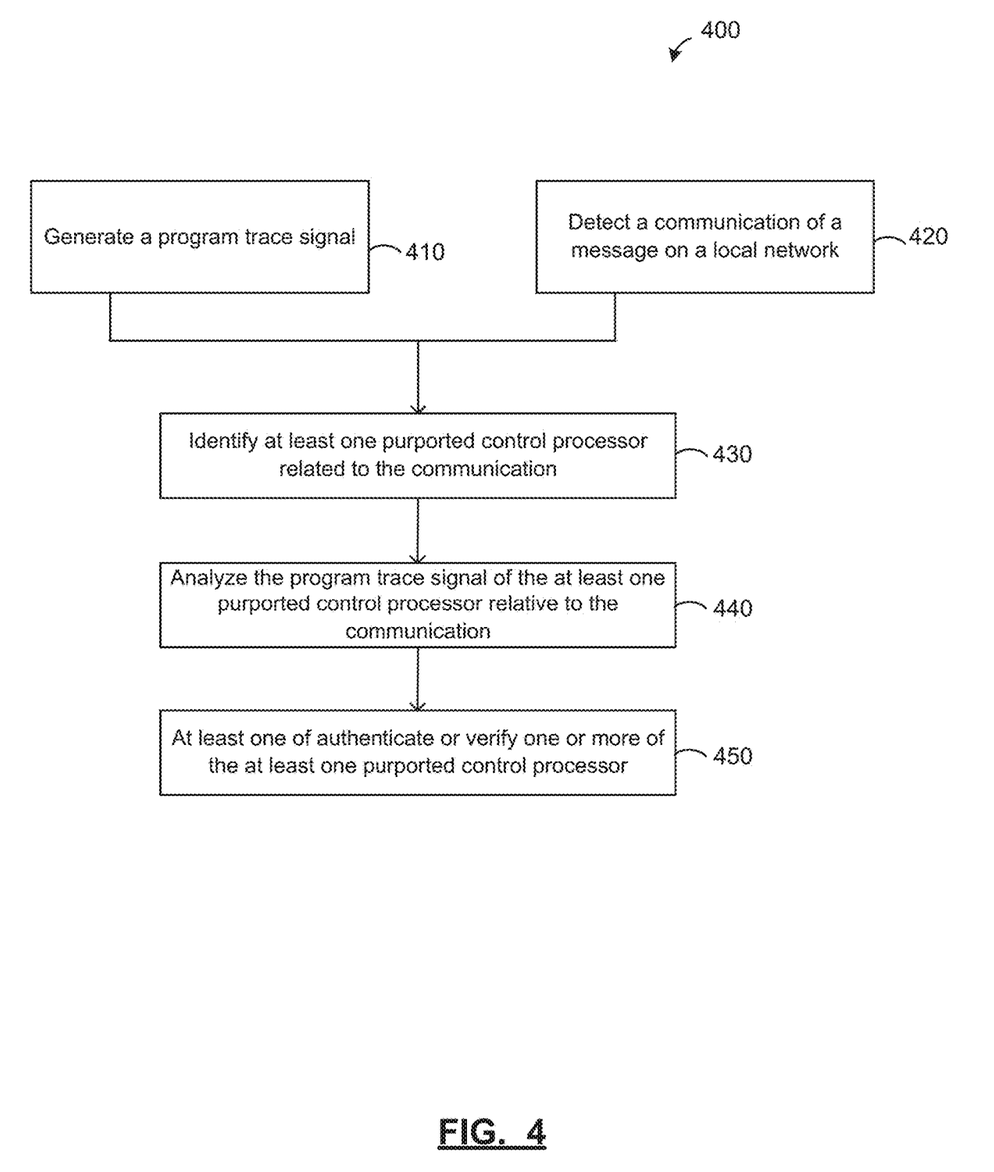
FIG. 4 depicts a flowchart of a method for side-channel monitoring of a local network, in accordance with at least one embodiment.

Referring now to FIG. 4, an example method 400 of monitoring a local network is shown in a flowchart diagram. To assist with the description of the method 400, reference will be made simultaneously to FIG. 1 to FIG. 3.

At 410, a detector, such as example detectors 106, 206, 312, 314, and 316, generates a program trace signal. The program trace signal can be obtained from a control processor connected to the local network, such as example electronic control units 102, 202, 318, 320, and 322. In some embodiments, the program trace signal can be derived from the power consumption of the control processor, such as that obtained by detector 100 via the resistor 104. In some embodiments, the program trace signal can be derived from electromagnetic emissions of the control processor, such as that obtained by detector 206 via radio frequency probe 204 and radio frequency amplifier 210. In some embodiments, the program trace signal can be derived from acoustic emanations of the control processor. In some embodiments, the local network can include a controller area network, such as example CAN bus 330.

At 420, a monitoring processor is operated to detect a communication of a message on the local network. A plurality of control processors can be connected to the local network and transmitting messages from one another over the local network. The messages transmitted over the local network can include information about the source of the message, that is, a purported transmitter of the message and information about the destination of the message, that is, an intended recipient of the message.

It should be noted that FIG. 4 illustrates the generation of the program trace at 410 occurring concurrently as the detection of a communication of a message on the local network at 420. However, in some embodiments, the generation of the program trace at 410 can occur continuously while detection of a communication of a message on the local network 420 can be a discrete occurrence.

At 430, the monitoring processor is operated to identify at least one purported control processor related to the communication. The at least one purported control processor can be determined from the message. In some embodiments, the at least one purported control processor can include a purported transmitter of the message. In some embodiments, the at least one purported control processor can include an intended recipient of the message.

At 440, the monitoring processor is operated to analyze the program trace signal of the purported control processor relative to the communication. In some embodiments, the monitoring processor can be operated to analyze the program trace signal of the purported transmitter of the message during the communication. That is, the monitoring processor can analyze the program trace signal of the purported transmitter of the message as the purported transmitter is transmitting the message.

In some embodiments, the monitoring processor can be operated to analyze the program trace signal of each control processor of the plurality of control processors on the local network during the communication; and classify each control processor as being one of transmitting the message or not transmitting the message based on the program trace signal of that control processor. In the event that the control processors of the purported transmitter of the message is classified as having been transmitting during the communication, the monitoring processor can authenticate the purported transmitter of the message. In the event that none of the control processors of the plurality of control processors are classified as having been transmitting during the communication, the monitoring processor may not authenticate the purported transmitter. In some embodiments, the monitoring processor can generate an anomaly notification indicating that the purported transmitter of the message could not be authenticated.

In some embodiments, the monitoring processor can be operated to analyze the program trace signal of the intended recipient of the message following the communication. That is, the monitoring processor can analyze the program trace signal of the intended recipient of the message as the intended recipient of the message is processing the message. For example, the message can include a command for the intended recipient. The monitoring processor can analyze the program trace signal of the intended recipient of the message as the intended recipient of the message is executing the message.

In some embodiments, the monitoring processor can operate to compare the program trace signal of the at least one purported control processor to an expected program trace signal. For example, the monitoring processor can determine an expected program trace signal based on the command for the intended recipient that is included in the message. If the program trace signal of the intended recipient is substantially similar to the expected program trace signal, the monitoring processor can verify the command execution of the intended verification. If the program trace signal of the intended recipient is not substantially similar to the expected program trace signal, the monitoring processor may not verify the intended recipient. In some embodiments, the monitoring processor can generate an anomaly notification indicating that the command execution of intended recipient of the message could not be verified.

In some embodiments, the monitoring processor can be operated to analyze the program trace signal of each control processor of the plurality of control processors on the local network following the communication; and classify each control processor as being one of processing the message or not processing the message based on the program trace signal of that control processor. In the event that a control processor of the plurality of control processors is classified as having been processing the message following the communication and that control processor was not identified as the intended recipient of the message, the monitoring processor can generate an anomaly notification. That is, the monitoring processor can detect when a control processor that is not the intended recipient was processing the message.

In some embodiments, the monitoring processor can be operated to analyze both the program trace signal of the purported transmitter of the message during the communication and the program trace signal of the intended recipient of the message following the communication.

At 450, the monitoring processor is operated to at least one of authenticate or verify the purported control processor. In some embodiments, the monitoring processor can operate to authenticate the purported transmitter of the message identified at 430. In some embodiments, the monitoring processor can operate to verify the intended recipient of the message identified at 430. In some embodiments, the monitoring processor can operate to authenticate the purported transmitter of the message identified at 430 and verify the intended recipient of the message identified at 430.

In some embodiments, the lengths of the segments of the program trace signal of the at least one purported control processor can vary. In some embodiments, the length of the segment can be configured based on the monitoring processor or the control processor, such as hardware specification and a desired system performance. In some embodiments, the length of the segment can be based on the content of the message, such as a command included in the message. In some embodiments, the length of the segment can depend on a minimum time for transmitting non-empty messages, which can, in turn depend on a minimum length of a non-empty message. The length of the segment can also can depend on a maximum time of transmitting messages, which can, in turn depend on a maximum length of a message.

The segments of the program trace signal can be contiguous or overlapping segments of the program trace signal.

When a message with identifying data that corresponds to a given control processor, such as control processor 318 is observed on the local network 330, the system 300 can monitor the side-channel of each of the control processors 318, 320, and 322 to determine whether it is only control processor 318 is transmitting.

Conversely, if side-channel information for a given control processor, such as control processor 320 indicates that control processor 320 is transmitting, but there is no transmission occurring on the local network 330 detected via 306, the system 300 can detect and generate a notification that the condition is anomalous. Such anomalous conditions can be detected for any of the control processors 318, 320, and 322.

After a message intended for a given control processor, such as control processor 322 is observed on the local network 330, the system 300 can determine whether only the program trace of control processor 322, that is, the intended recipient, indicates that it processed the message, or responded in a significant way to the message.

Similarly, if the program trace of another control processor indicates that it is processing a message, but there is no recently transmitted message intended for that control processor, the system can and generate a notification that the condition is anomalous. Such anomalous conditions can be detected for any of the control processors 318, 320, and 322.

In addition to generating a notification that the condition is anomalous, the monitoring processor 302 and/or the control processors 318, 320, and 322 can take preventive action(s), depending on the type of anomalous condition. Such preventative action can depend on the application. For example, when a purported transmitter of a message cannot be authenticated, the intendent recipient can, in response to the notification of an anomalous condition, ignore or disregard the message.

The monitoring processor 302 can include for example, a supervised learning system trained to learn the typical pattern of power consumption (or any other side-channel or combination of side-channels) during transmission, as well as the typical patterns that the side-channel exhibits while the recipient of the message processes it. Once the patterns have been learned, the system 300 can be operated to monitor the local network.

In respect of sender authentication, when a transmission is observed on the local network 330, the system 300 can classify, for each control processor 318, 320, 322, the corresponding fragment of program trace during the transmission as one of two possible states: (1) control processor is transmitting, or (2) control processor is not transmitting. The system 300 can authenticate the sender if the control processor identified in the transmission as the sender was the only control processor classified as transmitting based on the program trace.

In respect of command execution verification, when a transmission is observed on the local network 330, the system 300 can obtain for each control processor 318, 320, 322, the corresponding fragment of program trace during an interval of time immediately following the end of the transmission. The system 300 can then classify this fragment, for each control processor 318, 320, 322, as one of two possible states: (1) control processor is executing the command, or (2) control processor is not executing the command. The system 300 can authenticate the receiver if the control processor identified in the transmission as the receiver was the only control processor classified as executing the command based on the program trace.

The intended recipient may be obtained either through analysis of the transmission, which in turn may be based on machine learning techniques, where the correspondence between transmissions and their recipient is "learned" by the system 300. The monitoring system 300 may be configured to have multiple models or training databases, depending on the command, the recipient, etc. Similarly, the interval of time after the transmission may also be variable. For example, it could depend on the specific command being processed.

The transmitted command can be either part of the normal ongoing transmissions that are part of the functionality of the system 300, or it can be a message deliberately transmitted by the system 300. The system 300 can transmit a message or sequences of messages crafted in any suitable way to allow the system 300 to assess the integrity of a given control processor, in an on-demand manner.

In addition, the system 300 can verify the command execution of the receiver. Having learned the typical program traces of specific commands, the system 300 can compare the fragment of program trace of the intended recipient during an interval of time immediately following the end of the transmission with an expected program trace. If the observed program trace is similar to the expected program trace, the command execution of the receiver can be verified. If the observed program trace is dissimilar to the expected program trace, the command execution for the receiver may not be verified.

The system 300 can continuously monitor the local network, even when transmission are not observed to detect anomalous conditions. For example, during the times where transmissions are not observed, the system 300 can extract segments, possibly contiguous, overlapping segments, of captured side-channel traces for each control processor. With these trace segments, the system 300 can perform identification to determine whether the given control processor matches the pattern of a transmitting control processor, or that of a receiving control processor (i.e., processing a received command). If the system 300 determines that there is a match, it can generate a notification of an anomalous condition.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. A system for monitoring a local network, the system comprising:
   a. a plurality of control processors connected to the local network;
   b. for each control processor, a detector operable to generate a program trace signal from at least one of power consumption, electromagnetic emission, or acoustic emanation of the control processor; and
   c. a monitoring processor operable to:
      i. detect a communication of a message on the local network;
      ii. identify at least one purported control processor related to the communication;
      iii. analyze the program trace signal of the at least one purported control processor relative to the communication; and
      iv. authenticate one or more purported control processors of the at least one purported control processor based on the program trace signal of the at least one purported control processor;
   wherein the at least one purported control processor comprises a purported transmitter of the message; and the monitoring processor is operable to:
      a. analyze the program trace signal of each control processor of the plurality of control processors; and
      b. classify each control processor as being one of transmitting the message or not transmitting the message based on the program trace signal.

2. The system of claim 1, wherein the monitoring processor being operable to analyze the program trace signal of the at least one purported control processor relative to the communication comprises the monitoring processor being operable to analyze the program trace signal of the purported transmitter of the message during the communication.

3. The system of claim 1, wherein the monitoring processor is operable to generate an anomaly notification in response to having classified each control processor of the plurality of control processors as not transmitting the message.

4. The system of claim 1, wherein the monitoring processor being operable to analyze the program trace signal of the at least one purported control processor comprises the monitoring processor being operable to analyze contiguous or overlapping segments of the program trace signal of the at least one purported control processor.

5. The system of claim 1, wherein the local network comprises a controller area network.

6. A system for monitoring a local network, the system comprising:
   a. a plurality of control processors connected to the local network;
   b. for each control processor, a detector operable to generate a program trace signal from at least one of power consumption, electromagnetic emission, or acoustic emanation of the control processor; and
   c. a monitoring processor operable to:
      i. detect a communication of a message on the local network;
      ii. identify at least one purported control processor related to the communication;
      iii. analyze the program trace signal of the at least one purported control processor relative to the communication; and
      iv. verify one or more purported control processors of the at least one purported control processor based on the program trace signal of the at least one purported control processor;
   wherein the at least one purported control processor comprises an intended recipient of the message; and the monitoring processor is operable to:
      a. analyze the program trace signal of each control processor of the plurality of control processors; and
      b. classify each control processor as being one of processing the message or not processing the message based on the program trace signal.

7. The system of claim 6, wherein the monitoring processor being operable to analyze the program trace signal of the at least one purported control processor relative to the communication comprises the monitoring processor being operable to analyze the program trace signal of the intended recipient of the message following the communication.

8. The system of claim 6, wherein the monitoring processor is operable to generate an anomaly notification in response to having classified a control processor of the plurality of control processors as processing the message and not having been identified as the intended recipient of the message.

9. The system of claim 6, wherein the monitoring processor being operable to analyze the program trace signal of the at least one purported control processor comprises the monitoring processor being operable to analyze contiguous or overlapping segments of the program trace signal of the at least one purported control processor.

10. The system of claim 6, wherein the local network comprises a controller area network.

11. A method for monitoring a local network, the method comprising:
   a. for each control processor connected to the local network, generating a program trace signal from at least one of power consumption, electromagnetic emission, or acoustic emanation of the control processor; and b. operating a monitoring processor to:
   i. detect a communication of a message on the local network;
   ii. identify at least one control processor connected to the local network as at least one purported control processor related to the communication;
   iii. analyze the program trace signal of the at least one purported control processor relative to the communication; and
   iv. authenticate one or more purported control processors of the at least one purported control processor based on the program trace signal of the at least one purported control processor;

wherein the at least one purported control processor comprises a purported transmitter of the message; and the method comprises operating the monitoring processor to:
   a. analyze the program trace signal of each control processor of a plurality of control processors on the local network; and
   b. classify each control processor as being one of transmitting the message or not transmitting the message based on the program trace signal.

12. The method of claim 11, wherein operating the monitoring processor to analyze the program trace signal of the at least one purported control processor relative to the communication comprises operating the monitoring processor to analyze the program trace signal of the purported transmitter of the message during the communication.

13. The method of claim 11 comprises operating the monitoring processor to generate an anomaly notification in response to having classified each control processor of the plurality of control processors as not transmitting the message.

14. The method of claim 11, wherein operating the monitoring processor to analyze the program trace signal of the at least one purported control processor comprises operating the monitoring processor to analyze contiguous or overlapping segments of the program trace signal of the at least one purported control processor.

15. The method of claim 11, wherein the local network comprises a controller area network.

16. A method for monitoring a local network, the method comprising:

a. for each control processor connected to the local network, generating a program trace signal from at least one of power consumption, electromagnetic emission, or acoustic emanation of the control processor; and b. operating a monitoring processor to:
   i. detect a communication of a message on the local network;
   ii. identify at least one control processor connected to the local network as at least one purported control processor related to the communication;
   iii. analyze the program trace signal of the at least one purported control processor relative to the communication; and
   iv. verify one or more purported control processors of the at least one purported control processor based on the program trace signal of the at least one purported control processor;

wherein the at least one purported control processor comprises an intended recipient of the message; and the method comprises operating the monitoring processor to:
   a. analyze the program trace signal of each control processor of the plurality of control processors; and
   b. classify each control processor as being one of processing the message or not processing the message based on the program trace signal.

17. The method of claim 16, wherein operating the monitoring processor to analyze the program trace signal of the at least one purported control processor relative to the communication comprises operating the monitoring processor to analyze the program trace signal of the intended recipient of the message following the communication.

18. The method of claim 16 comprises operating the monitoring processor to generate an anomaly notification in response to having classified a control processor of the plurality of control processors as processing the message and not identified as the intended recipient of the message.

19. The method of claim 16, wherein operating the monitoring processor to analyze the program trace signal of the at least one purported control processor comprises operating the monitoring processor to analyze contiguous or overlapping segments of the program trace signal of the at least one purported control processor.

20. The method of claim 16, wherein the local network comprises a controller area network.

* * * * *